(12) United States Patent
Jia et al.

(10) Patent No.: US 11,546,834 B2
(45) Date of Patent: Jan. 3, 2023

(54) ACCESS BARRING METHOD AND APPARATUS AND COMMUNICATION SYSTEM

(71) Applicant: FUJITSU LIMITED, Kawasaki (JP)

(72) Inventors: Meiyi Jia, Beijing (CN); Yulong Shi, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/393,429

(22) Filed: Apr. 24, 2019

(65) Prior Publication Data
US 2019/0253953 A1 Aug. 15, 2019

Related U.S. Application Data

(63) Continuation of application No. PCT/CN2017/076790, filed on Mar. 15, 2017.

(51) Int. Cl.
*H04W 48/06* (2009.01)
*H04W 28/02* (2009.01)
*H04W 76/27* (2018.01)
*H04W 8/22* (2009.01)
*H04W 74/02* (2009.01)
*H04W 48/02* (2009.01)

(52) U.S. Cl.
CPC ............ *H04W 48/06* (2013.01); *H04W 8/22* (2013.01); *H04W 28/0215* (2013.01); *H04W 28/0289* (2013.01); *H04W 48/02* (2013.01); *H04W 74/02* (2013.01); *H04W 76/27* (2018.02)

(58) Field of Classification Search
CPC .......... H04W 48/02; H04W 4/70; H04L 63/00
See application file for complete search history.

(56) References Cited

U.S. PATENT DOCUMENTS 3,478,286 A1 7/2013 Fan et al.
8,478,286 B1 * 7/2013 Fan .................. H04W 72/0446
455/452.1
(Continued)

FOREIGN PATENT DOCUMENTS

CN 102892173 A 1/2013
CN 103096416 A 5/2013
(Continued)

OTHER PUBLICATIONS

Catt, "Consideration on Access Control Mechanism", Agenda Item: 3.2.2.6, 3GPP TSG-RAN WG2 Meeting Ad Hoc, R2-1700216, Spokane, USA, Jan. 17-19, 2017. (Year: 2017).*
(Continued)

*Primary Examiner* — Romani Ohri
(74) *Attorney, Agent, or Firm* — Myers Wolin, LLC

(57) ABSTRACT

An access barring method and apparatus and a communication system. The method includes: performing access barring check or access class determination by UE by using parameters defined for a new radio system. The parameters are applicable to all radio resource control (RRC) states. For different public land mobile networks (PLMNs) and/or network slicing, the parameters are identical or different. With the embodiments of this disclosure, selectable parameters are provided for a uniform access control mechanism defined by an NR system, thereby simplifying an access mechanism, and ensuring all-directional compatibility of a terminal state.

17 Claims, 2 Drawing Sheets

(56) References Cited

U.S. PATENT DOCUMENTS

| | | | | |
|---|---|---|---|---|
| 2009/0029698 | A1* | 1/2009 | Venkob | H04W 48/18 |
| | | | | 455/433 |
| 2015/0119060 | A1 | 4/2015 | Aoyagi et al. | |
| 2015/0141007 | A1* | 5/2015 | Du | H04W 48/16 |
| | | | | 455/434 |
| 2017/0201939 | A1* | 7/2017 | Lee | H04W 48/20 |
| 2018/0049258 | A1* | 2/2018 | Kim | H04W 48/02 |
| 2018/0054760 | A1* | 2/2018 | Chun | H04W 76/27 |
| 2018/0139783 | A1* | 5/2018 | Park | H04W 88/08 |
| 2019/0364489 | A1* | 11/2019 | Liberg | H04L 1/1614 |
| 2019/0387457 | A1* | 12/2019 | Liu | H04W 72/1268 |

FOREIGN PATENT DOCUMENTS

| | | |
|---|---|---|
| CN | 103096495 A | 5/2013 |
| JP | 2013-243598 A | 12/2013 |
| WO | 2013/176121 A1 | 11/2013 |
| WO | 2015/148013 A1 | 10/2015 |

OTHER PUBLICATIONS

ZTE et al., "Consideration on the access control in NR", Agenda Item: 3.2.2.6, 3GPP TSG-RAN WG2 Meeting NR Ad Hoc, R2-1700151, Spokane, USA, Jan. 17-19, 2017. (Year: 2017).*

International Search Report issued by the State Intellectual Property Office of the P R. China for corresponding International Patent Application No. PCT/CN2017/076790, dated Dec. 19, 2017, with an English translation.

Written Opinion of the International Searching Authority issued by the State Intellectual Property Office of the P.R. China for corresponding International Patent Application No. PCT/CN2017/076790, dated Dec. 19, 2017, with an English translation.

Catt, "Consideration on Access Control Mechanism", Agenda Item: 3.2.2 6, 3GPP TSG-RAN WG2 Meeting Ad Hoc, R2-1700216, Spokane, USA, Jan. 17-19, 2017.

Zte et al., "Consideration on the access control in NR", Agenda Item: 3.2.2.6, 3GPP TSG-RAN WG2 Meeting NR Ad Hoc, R2-1700151, Spokane, USA, Jan. 17-19, 2017.

Intel Corporation, "Considerations on the design aspects for NR access control", Agenda Item: 10.2.2.6, 3GPP TSG-RAN WG2 Meeting #97, R2-1701740 (revision of R2-1700349), Athens, Greece, Feb. 13-17, 2017.

Notice of Reasons for Refusal by the Japan Patent Office issued for corresponding Japanese Patent Application No. 2019-545782, dated Jul. 14, 2020, with English translation attached.

First Notification of Office Action and Search Report issued by the China National Intellectual Property Administration for corresponding Chinese Patent Application No. 201780084770.0, dated Oct. 25, 2022, with an English translation.

* cited by examiner

Fig. 1
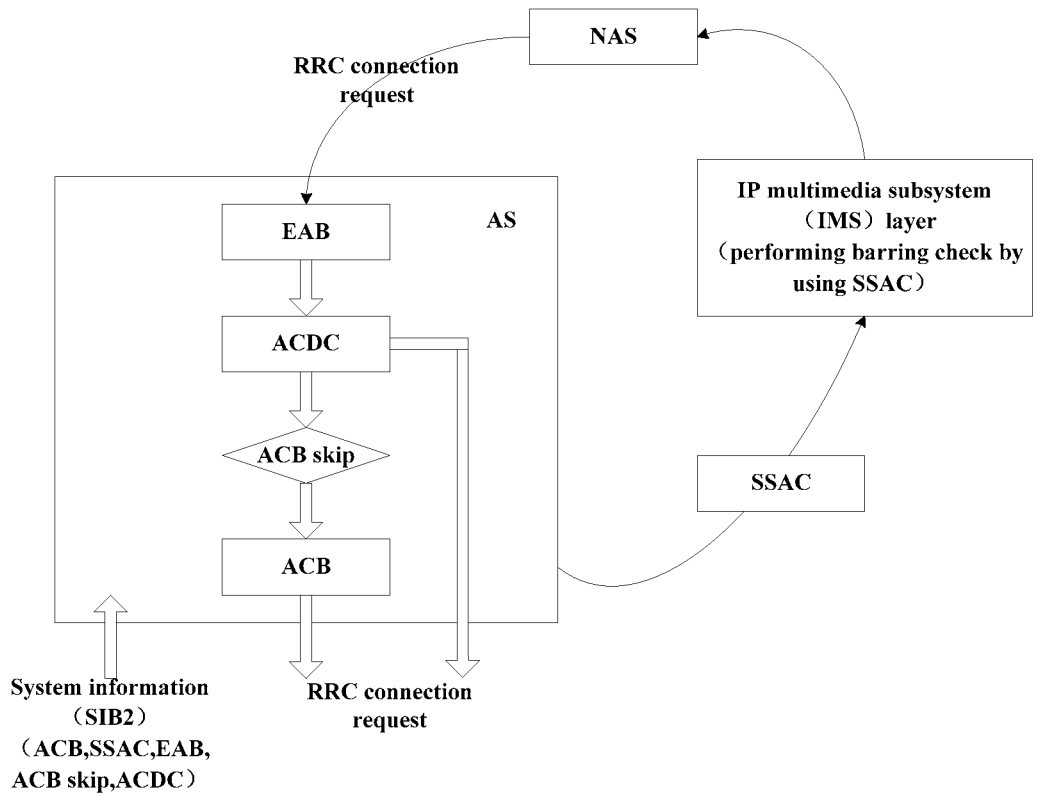
Fig. 2
201
a UE performs access barring check or access class determination by using parameters defined for a new radio (NR) system
Fig. 3
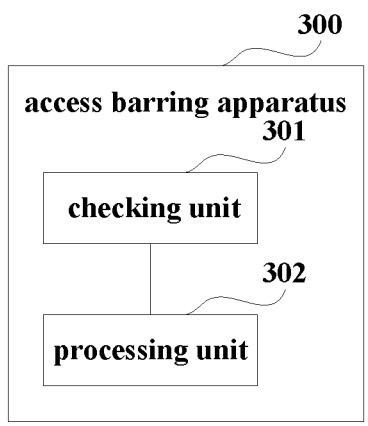

ACCESS BARRING METHOD AND APPARATUS AND COMMUNICATION SYSTEM

CROSS REFERENCE TO RELATED APPLICATIONS

This application is a continuation application of International Application PCT/CN2017/076790 filed on Mar. 15, 2017, the entire contents of which are incorporated herein by reference.

FIELD

This disclosure relates to the field of communications, and in particular to an access barring method and apparatus and a communication system.

BACKGROUND

In a long term evolution (LTE) system, there exist a plurality of types of access barring technologies, and as shown in FIG. 1, access class barring (ACB) is an access barring mechanism based on a type of access attempt (such as data initiated by user equipment or signaling initiated by user equipment) and an access class (AC) to which terminal (UE, user equipment) belongs, "ACB skip" is a high-priority access barring mechanism permitting multimedia telephony (MMTEL) voice and/or video and short message service (SMS), service-specific access control (SSAC) is an access barring mechanism of a session initiated by an MMTEL voice and/or video, extended access barring (EAB) is a machine type communication (MTC) specific access barring mechanism, "AB for NB-IoT" is cellular-based narrow band Internet of Things (NB-IoT) specific access barring mechanism, and application-specific congestion control for data communication (ACDC) is an access barring mechanism of a specific application determined by a terminal operator.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a new radio (NR) system, the second group of the radio access network (RAN2) agrees to define a uniform access control mechanism for the NR, so as to process all cases and scenarios defined in the LTE, and process possible cases and/or scenarios in the future. And furthermore, the uniform access control mechanism defined in RAN2 is applicable to all radio resource control (RRC) protocol states of the NR, such as an idle state (RRC_IDLE), a connected state (RRC_CONNECTED), and an inactive state (RRC_INACTIVE). Hence, parameters used by the access control mechanism are study directions in the industry.

For the above problems, embodiments of this disclosure provide an access barring method and apparatus and a communication system.

According to a first aspect of the embodiments of this disclosure, there is provided an access barring apparatus, including:

a checking unit configured to perform access barring check or access class determination by using parameters defined for a new radio system.

According to a second aspect of the embodiments of this disclosure, there is provided an access barring method, including:

performing access barring check or access class determination by UE by using parameters defined for a new radio system.

According to a third aspect of the embodiments of this disclosure, there is provided a communication system, including a network device and UE, the UE having the apparatus as described in the first aspect.

An advantage of the embodiments of this disclosure exists in that with the embodiments of this disclosure, selectable parameters are provided for a uniform access control mechanism defined by an NR, thereby simplifying an access mechanism, and ensuring all-directional compatibility of a terminal state.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/include/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 1 is a schematic diagram of an access barring technology in an LTE system;

FIG. 2 is a schematic diagram of the access barring method of Embodiment 1;

FIG. 3 is a schematic diagram of the access barring apparatus of Embodiment 2;

DETAILED DESCRIPTION

Figure 4:
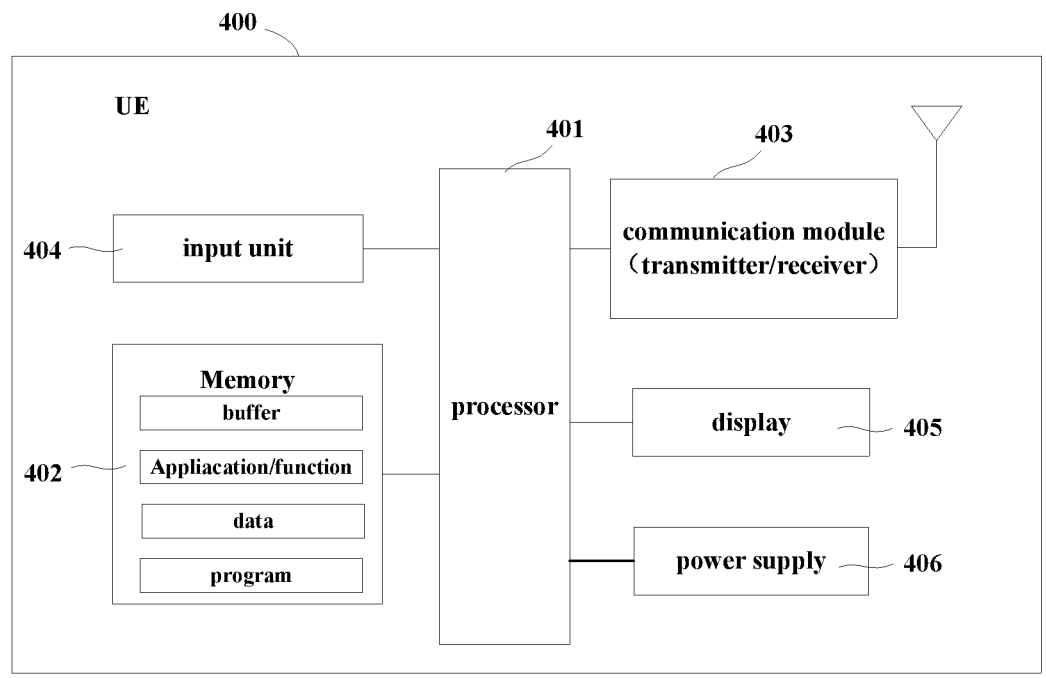
FIG. 4 is a schematic diagram of the UE of Embodiment 2.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various implementations of the embodiments of this disclosure shall be described with reference to the accompanying drawings. These implementations are illustrative only, and are not intended to limit this disclosure.

In this disclosure, a base station may be referred to as an access point, a broadcast transmitter, a node B, or an evolution node B (eNB), etc., and may include some or all functions of them. A term "base station" shall be used in the text, and each base station provides communication coverage for a specific geographical region.

In this disclosure, a mobile station or equipment may be referred to as user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, a cordless telephone, and a vehicle, etc.

The embodiments of this disclosure shall be described below with reference to the accompanying drawings.

Embodiment 1

The embodiment of the present disclosure provides an access barring method. FIG. 2 is a schematic diagram of the method. As shown in FIG. 2, the method includes:

block 201: a UE performs access barring check or access class determination by using parameters defined for a new radio (NR) system.

In an embodiment, possible parameters are defined for the uniform access control mechanism defined for the NR by RAN2. Hence, control of access barring may be achieved by using one or two parameters only, thereby simplifying a procedure of access control, and being compatible with all states of the UE.

In an embodiment, the parameters defined for the NR system are applicable to all states of the UE, such as the above-described idle state, the connected state and the inactive state. Hence, a specific access barring mechanism may be selected without need of considering RRC states, that is, control of access barring may be achieved. And in an embodiment, different RRC states may use identical parameters, or may use different parameters, and for identical parameters, identical values may be set, or different values may be set.

In an embodiment, for different public land mobile networks (PLMNs) and/or network slicing, the parameters are identical or different, and when the parameters are identical, parameter values may be identical or different. Hence, different PLMNs and/or different network slicing may be differentiated by different parameters as needed, or may be differentiated by different parameter values of identical parameters, thereby further simplifying an access procedure.

In one implementation of an embodiment, the parameters are defined from angles of cases and scenarios. For example, the parameter may be UE-related parameter, or may be service-related parameter, or may be a combination of UE-related parameter and service-related parameter, that is, UE-related parameter and service-related parameter are all included. The UE-related parameter here is, for example, parameters defined in consideration of the following factors, including but not limited to: a device type, such as a low-cost device, and a contracted service type, such as GSM, and M-zone. The service-related parameter here is, for example, parameters defined in consideration of the following factors, including but not limited to: a service, such as voice, and video; an application, such as QQ initiation, Microsoft Service Network (MSN) initiation, and WeChat initiation; a call type, such as emergency call, and signaling initiated by a terminal; and quality of service (QoS) and/or a flow identifier (ID), etc.

Hence, parameters possibly used in the uniform access control mechanism of the NR may be defined by using the above one parameter (a UE-related parameter or a service-related parameter) or two parameters (the UE-related parameter and the service-related parameter), and the UE may perform the access barring check or the access class determination by using the parameter(s), thereby simplifying the access mechanism.

In another implementation of an embodiment, the parameters are defined from angles of change and/or update. For example, the parameters may be static parameters, or may be dynamic parameters, or may be a combination of static parameters and dynamic parameters, that is, static parameters and dynamic parameters are all included. The static parameters here refer to statically changed parameters; for example, they are parameters written into a subscriber identity module (SIM) and/or a universal subscriber identity module (USIM); for another example, they are parameters changed and/or updated only when operation administration and maintenance (OAM) indicates; for further example, they are parameters changed and/or updated only when an RRC state changes. And the dynamic parameters here are, for example, parameters changed and/or updated of an Internet protocol (IP) flow level.

Hence, parameters possibly used in the uniform access control mechanism of the NR may be defined by using the above one parameter (a static parameter or a dynamic parameter) or two parameters (the static parameter and the dynamic parameter), and the UE may perform the access barring check or the access class determination by using the parameter(s), thereby simplifying the access mechanism.

In a further implementation of an embodiment, the parameters are defined from an angle of model. For example, the parameters may be parameters provided by an upper layer, or may be parameters provided by an access stratum (AS), or may be a combination of parameters provided by an upper layer and parameters provided by an AS, that is, parameters provided by an upper layer and parameters provided by an AS are all included. The parameters provided by an upper layer here are, for example, parameters provided by a non-access stratum (NAS) and/or an application layer. The parameters provided by the AS here are, for example, parameters without indication provided by the upper layer.

Hence, parameters possibly used in the uniform access control mechanism of the NR may be defined by using the above one parameter (a parameter provided by an upper layer or a parameter provided by an AS) or two parameters (the parameter provided by an upper layer and the parameter provided by an AS), and the UE may perform the access barring check or the access class determination by using the parameter(s), thereby simplifying the access mechanism.

In still another implementation of an embodiment, the parameters are defined from an angle of barring check. For example, the parameters may be bitmap-related parameters, or may be factor-related parameters, or may be a combination of bitmap-related parameters and factor-related parameters, that is, the bitmap-related parameters and the factor-related parameters are all included.

In an implementation, if the bitmap-related parameters are used, the network device may inform the UE of a corresponding bitmap; for example, for each bit, "0" denotes barring, and "1" denotes passing. In an implementation, different RRC states may correspond to different bitmaps; however, the embodiment is not limited thereto. In an implementation, in the bitmap, each bit may correspond to one of the parameters or a combination of a plurality of parameters listed in the above three implementations, such as each UE-related parameter or each service-related parameter, or may be other parameters that are not listed, and the embodiment is not limited thereto, only if barring or passing of information corresponding to bits may be indicated via the bitmap.

In an implementation, if the factor-related parameters are used, the network device may define a factor between 0 and 1 according to a predetermined policy, such as a network congestion situation, and inform the UE of the factor. The UE acquires a random number on its own, and if the random number is less than the factor, it is check as "passing", otherwise, it is check as "barring". In an implementation, a factor may be provided for different UEs for use by them, or a factor may be provided for different services for use by them; however, the embodiment is not limited thereto.

In one example, if network congestion is heavy, the network device may define a factor 0.1 and inform the UE of the factor. And the UE generates a random number, and if the random number is less than 0.1, the UE may access to the network or transmit information and/or data to the network device. Hence, only 10% of the UEs is able to access to the network or transmit data to the network device.

In another example, if network congestion is not heavy, the network device may define a factor 0.9 and inform the UE of the factor. And the UE generates a random number, and if the random number is less than 0.9, the UE may access to the network or transmit data to the network device. Hence, 90% of the UEs at most is able to access to the network or transmit information and/or data to the network device.

The parameters defined for the uniform access control mechanism of NR are described in the above four implementations by defining the parameters from different angles. In one implementation, the above parameters may be used in input of the access barring mechanism, that is, access barring check may be performed by using the above parameters, so as to determine whether to transmit a request to the network (passing or barring); and in another implementation, the above parameters may be used as different dimensions of an access class, that is, an access class may be determined through any combination of the above parameters, and whether to transmit the request to the network (passing or barring) may be determined according to the access class, or other processing may be performed according to the access class.

In one of the above implementations, how to perform access barring check by using the above defined parameters is not limited. For example, access barring check may be performed according only to the above parameters, or access barring check may be performed with reference to system information, which is dependent on particular implementation, and is not limited in the embodiment. And as to performing access barring check by using the above defined parameters, one of the parameters defined in the above four implementations may be used only, or the parameters defined in the above four implementations may be used in a combined manner, which is dependent on particular implementation, and is not limited in the embodiment.

In another of the above implementations, as to perform access class determination by using the above defined parameters, the parameters defined in the above four implementations may be combined as a multi-dimensional parameter, so as to determine an access class. In the embodiment, a definition of the access class is not limited. For example, for the access class, following may be taken into account: 1) each access attempt in different RRC states is mapped into "an access class"; and 2) only "an access class" is taken into account in performing access barring check. As to the definition of the access class, it may be identical to that in existing standard, or a possible definition that is developed in the future may be employed.

In an embodiment, after the access barring check or access class determination on corresponding parameters is performed, the UE may determine a subsequent action according to a result of the check.

For example, if the result of the check is barring (corresponding to the connected state or the idle state) or suspending (corresponding to the inactive state), the UE may immediately bar, and does not transmit any request to the network device; or the UE may bar for a period of time, and transmit a request to the network device after the period of time passes, the period of time may be defined in protocols, or may be configured by the network.

For another example, if the result of the check is passing (corresponding to the connected state or the idle state) or recovering (corresponding to the inactive state), the UE may immediately pass, and transmit a request to the network device; or the UE may pass after a period of time, that is, the UE transmits a request to the network device after the period of time; or the UE may pass when a certain condition is satisfied, that is, the UE transmits a request to the network device when the certain condition is satisfied, the period of time may be defined in protocols, or may be configured by the network, the condition may be defined in protocols, or may be configured by the network.

In an embodiment, after performing access barring check or access class determination on corresponding parameters, the UE may proceed with checking on parameters of the same class or all remained parameters or network-designated parameters. Hence, whether the access request is barred or permitted may be determined.

With the method of the embodiment, parameters possibly used in the uniform access control mechanism of NR may be defined by using one or two parameters, and the UE may use the parameter(s) to perform access barring check or access class determination, thereby simplifying the access mechanism.

Embodiment 2

The embodiment provides an access barring apparatus. As principles of the apparatus for solving problems are similar to that of the method in Embodiment 1, the implementation of the method in Embodiment 1 may be referred to for implementation of the apparatus, with identical contents being not going to be described herein any further.

FIG. 3 is a schematic diagram of the access barring apparatus. As shown in FIG. 3, an access barring apparatus 300 includes a checking unit 301 configured to perform access barring check or access class determination by using parameters defined for a new radio system.

In an embodiment, the parameters defined for the NR system are applicable to all RRC states, different RRC states may use identical parameters, or may use different parameters, and for identical parameters, identical values may be set, or different values may be set. And for different public land mobile networks (PLMNs) and/or network slicing, the parameters may be identical or different, and when the parameters are identical, parameter values may be identical or different.

In one implementation, the parameter may be UE-related parameter and/or service-related parameter, and the checking unit 301 may perform the access barring check or the access class determination by using the UE-related parameter and/or the service-related parameter.

In the implementation, the UE-related parameter is defined according to one of the following or a combination thereof: a device type, and a contracted service type; and the service-related parameter is defined according to one of the following or a combination thereof: a service type, an application type, a call type, quality of service and/or a flow ID.

In another implementation, the parameters may be static parameters and/or dynamic parameters, and the checking unit 301 may perform the access barring check or the access class determination by using the static parameters and/or and dynamic parameters.

In the implementation, the static parameters may include one of the following or a combination thereof: a parameter written into a subscriber identity module (SIM) and/or a universal subscriber identity module (USIM), a parameter changed and/or updated only when operation administration and maintenance (OAM) indicates, and a parameter changed and/or updated only when a radio resource control (RRC) state changes; and the dynamic parameters includes: a parameter changed and/or updated of an Internet protocol (IP) flow level.

In another implementation, the parameters may be parameters provided by an upper layer and/or parameters provided by an access stratum (AS), and the checking unit 301 performs the access barring check or the access class determination by using the parameters provided by the upper layer and/or the parameters provided by the AS.

In an implementation, the parameters provided by the upper layer may include one of the following or a combination thereof: a parameter provided by an NAS, and a parameter provided by an application layer; and the parameters provided by the AS include: a parameter without indication provided by the upper layer.

In another implementation, the parameters may be bitmap-related parameters and/or factor-related parameters, and the checking unit 301 performs the access barring check or the access class determination by using the bitmap-related parameters and/or the factor-related parameters.

In an embodiment, as shown in FIG. 3, the apparatus 300 may further include a processing unit 302 configured to immediately bar or bar for a period of time when a result of the access barring check of the checking unit 301 is barring or suspending, and immediately pass or pass after a period of time or pass if a certain condition is satisfied when a result of the access barring check is passing or recovering.

In an embodiment, after performing access barring check on corresponding parameters, the checking unit 301 may further proceed with performing access barring check on parameters of the same class or all remained parameters or network-designated parameters.

With the apparatus of the embodiment, parameters possibly used in the uniform access control mechanism of NR may be defined by using one or two parameters, and the UE may use the parameter(s) to perform access barring check or access class determination, thereby simplifying the access mechanism.

The embodiment provides a UE, including the above-described access barring apparatus.

FIG. 4 is a schematic diagram of the UE 400 of the embodiment. As shown in FIG. 4, the UE 400 may include a processor 401 and a memory 402, the memory 402 being coupled to the processor 401. It should be noted that this figure is illustrative only, and other types of structures may also be used, so as to supplement or replace this structure and achieve a telecommunications function or other functions.

In one implementation, the functions of the above-described access barring apparatus may be integrated into the processor 401. In an implementation, the processor 401 may be configured to: perform access barring check or access class determination by using parameters defined for a new radio system.

In another implementation, the above-described access barring apparatus and the processor 401 may be configured separately. For example, the access barring apparatus may be configured as a chip connected to the processor 401, with its functions being realized under control of the processor 401.

As shown in FIG. 4, the UE 400 may further include a communication module 403, an input unit 404, a display 405, and a power supply 406. It should be noted that the UE 400 does not necessarily include all the parts shown in FIG. 4, and furthermore, the UE 400 may include parts not shown in FIG. 4, and the related art may be referred to.

As shown in FIG. 4, the processor 401 is sometimes referred to as a controller or control, which may include a microprocessor or other processor devices and/or logic devices, and the processor 401 receives input and controls operations of every component of the UE 400.

In an embodiment, the memory 402 may be, for example, one or more of a buffer memory, a flash memory, a hard drive, a mobile medium, a volatile memory, a nonvolatile memory, or other suitable devices, which may store various information, and furthermore, store programs executing related information. And the processor 401 may execute programs stored in the memory 402, so as to realize information storage or processing, etc. Functions of other parts are similar to those of the related art, which shall not be described herein any further. The parts of the UE 400 may be realized by specific hardware, firmware, software, or any combination thereof, without departing from the scope of the present disclosure.

With the UE of the embodiment, parameters possibly used in the uniform access control mechanism of NR may be defined by using one or two parameters, and the UE may use the parameter(s) to perform access barring check or access class determination, thereby simplifying the access mechanism.

Embodiment 3

The embodiment provides a communication system, including a network device and a UE.

Figure 5:
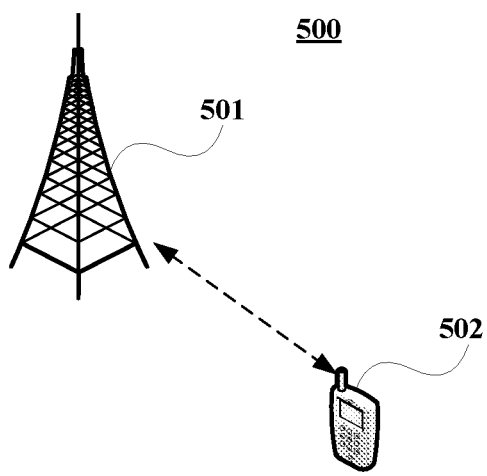
FIG. 5 is a schematic diagram of the communication system of Embodiment 3.

FIG. 5 is a schematic diagram of the communication system of the embodiment. As shown in FIG. 5, the communication system 500 includes a network device 501 and a UE 502; wherein, the network device 501 may be base station, and combinations and functions of the base station are not limited in the embodiment; and the UE 502 may be the UE 400 described in Embodiment 2.

As the UE 400 has been described in the above embodiment, its contents are incorporated herein, and shall not be described herein any further.

With the communication system of the embodiment, parameters possibly used in the uniform access control mechanism of NR may be defined by using one or two parameters, and the UE may use the parameter(s) to perform access barring check or access class determination, thereby simplifying the access mechanism.

An embodiment of the present disclosure provides a computer readable program, which, when executed in an access barring apparatus or a UE, will cause the access barring apparatus or the UE to carry out the access barring method as described in Embodiment 1.

An embodiment of the present disclosure provides a computer storage medium, including a computer readable program, which will cause an access barring apparatus or a UE to carry out the access barring method as described in Embodiment 1.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 3 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 3 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 3 may also be realized as a combination of computing equipment, such as a combination of a DSP and a microprocessor, a plurality of processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An access barring apparatus, comprising:
a memory configured to store a plurality of instructions;
processor circuitry coupled to the memory and configured to execute the plurality of instructions to:
perform an access barring check in any of radio resource control (RRC) states, including at least one of an RRC connected state and an RRC inactive state, based on a UE-related parameter and a UE-related and service-related parameter, and
wherein the UE-related parameter and the UE-related and service-related parameter are defined for a 3GPP New Radio (NR) system and are applicable to all the RRC states, and wherein different RRC states use identical parameters of the UE-related parameter and the UE-related and service-related parameter, and identical or different values are set for the identical parameters, and
wherein the UE-related parameter is defined at least according to a contracted service type; and the UE-related and service-related parameter is defined at least according to a call type.

2. The access barring apparatus according to claim 1, wherein for different public land mobile networks (PLMNs) and/or network slicing, the parameters are identical or different, and when the parameters are identical, parameter values are identical or different.

3. The access barring apparatus according to claim 1, wherein the UE-related parameter and the UE-related and service-related parameter are at least one of static parameters and dynamic parameters.

4. The access barring apparatus according to claim 3, wherein,
the static parameters comprise at least one of: a parameter written into a subscriber identity module (SIM), a universal subscriber identity module (USIM), a parameter changed and/or updated only when operation administration and maintenance (OAM) indicates, and a parameter changed and/or updated only when a radio resource control (RRC) state changes; and
the dynamic parameters comprise a parameter changed and/or updated via an Internet protocol (IP) flow level.

5. The access barring apparatus according to claim 1, wherein the UE-related parameter and the UE-related and service-related parameter are provided by at least one of an upper layer and an access stratum (AS).

6. The access barring apparatus according to claim 1, wherein the UE-related parameter and the UE-related and service-related parameter are at least one of bitmap-related parameters and factor-related parameters.

7. The access barring apparatus according to claim 1, wherein the processor circuitry is further configured
to immediately bar or bar for a period of time when a result of the access barring check is barring or suspending, and immediately pass or pass after a period of time or pass if a certain condition is satisfied when a result of the access barring check is passing or recovering.

8. The access barring apparatus according to claim 1, wherein after performing the access barring check on corresponding parameters, the processor circuitry is configured to proceed with performing access barring check on at least one of: parameters of the same class, all remained parameters, and network-designated parameters.

9. The access barring apparatus according to claim 1, wherein a control of the access barring is achieved so that an access barring mechanism is selected without a need of considering the RRC states.

10. The access barring apparatus according to claim 5, wherein the UE-related parameter and the UE-related and service-related parameter provided by the upper layer comprise at least one of: a parameter provided by a Non-Access Stratum (NAS), and a parameter provided by an application layer; and
the parameters provided by the access stratum (AS) comprise a parameter without indication provided by the upper layer.

11. An access barring method, comprising:
performing an access barring check in any of radio resource control (RRC) states, including at least one of an RRC connected state and an RRC inactive state, based on a UE-related parameter and a UE-related and service-related parameter and
wherein the UE-related parameter and the UE-related and service-related parameter are defined for a 3GPP New Radio (NR) system and are applicable to all the RRC states, and wherein different RRC states use identical parameters of the UE-related parameter and the UE-related and service-related parameter, and identical or different values are set for the identical parameters, and
wherein the UE-related parameter is defined at least according to a contracted service type; and the UE-related and service-related parameter is defined at least according to a call type.

12. The access barring method according to claim 11, wherein the UE-related parameter and the UE-related and service-related parameter are at least one of static parameters and dynamic parameters.

13. The access barring method according to claim 11, wherein the UE-related parameter and the UE-related and service-related parameter are at least one of bitmap-related parameters and factor-related parameters.

14. The access barring method according to claim 11, wherein the method further comprises:
immediately barring or barring for a period of time by the UE when a result of the access barring check is barring or suspending, and immediately passing or passing after a period of time or passing if a certain condition is satisfied by the UE when a result of the access barring check is passing or recovering.

15. The access barring method according to claim 11, wherein the method further comprises:
after performing the access barring check on corresponding parameters, proceeding with performing the access barring check on at least one of: parameters of the same class, all remained parameters, and network-designated parameters.

16. The access barring method according to claim 11, wherein the UE-related parameter and the UE-related and service-related parameter are provided by at least one of an upper layer and an access stratum (AS).

17. A communication system, comprising a network device and a User Equipment (UE), the UE comprising:
a memory configured to store a plurality of instructions;
processor circuitry coupled to the memory and configured to execute the plurality of instructions to:
perform an access barring check in any of radio resource control (RRC) states, including at least one of an RRC connected state and an RRC inactive state, based on a UE-related parameter and a UE-related and service-related parameter, and
wherein the UE-related parameter and the UE-related and service-related parameter are defined for a 3GPP New Radio (NR) system and are applicable to all the RRC states, and wherein different RRC states use identical parameters of the UE-related parameter and the UE-related and service-related parameter, and identical or different values are set for identical parameters, and
wherein the UE-related parameter is defined at least according to a contracted service type; and the UE-related and service-related parameter is defined at least according to a call type.

* * * * *